United States Patent
Lee

(10) Patent No.: US 12,239,878 B1
(45) Date of Patent: Mar. 4, 2025

(54) CRYSTAL YOGA MAT

(71) Applicant: Teresa Michelle Y Lee, Huntington Beach, CA (US)

(72) Inventor: Teresa Michelle Y Lee, Huntington Beach, CA (US)

( * ) Notice: Subject to any disclaimer, the term of this patent is extended or adjusted under 35 U.S.C. 154(b) by 0 days.

(21) Appl. No.: 18/501,459

(22) Filed: Nov. 3, 2023

(51) Int. Cl.
A63B 21/00 (2006.01)
B32B 25/02 (2006.01)
B32B 25/14 (2006.01)

(52) U.S. Cl.
CPC .......... *A63B 21/4037* (2015.10); *B32B 25/02* (2013.01); *B32B 25/14* (2013.01); *A63B 2209/00* (2013.01); *B32B 2264/10* (2013.01)

(58) Field of Classification Search
CPC ..... B32B 25/02; B32B 25/14; B32B 2264/10; A63B 2209/00; A63B 2209/10; A63B 6/00; A63B 6/02; A63B 21/4037; A47G 27/0237

See application file for complete search history.

(56) References Cited

U.S. PATENT DOCUMENTS

| | | | |
|---|---|---|---|
| D407,255 S | 3/1999 | Librett | |
| D414,643 S | 10/1999 | Phua | |
| D508,971 S | 8/2005 | Park | |
| D540,094 S | 4/2007 | Kessler et al. | |
| D540,095 S | 4/2007 | Lee | |
| D543,765 S | 6/2007 | Allen | |
| D549,030 S | 8/2007 | Kessler et al. | |
| D589,289 S | 3/2009 | Laure | |
| D591,096 S | 4/2009 | Lubart | |
| D602,725 S | 10/2009 | Lubart | |
| D609,042 S | 2/2010 | Wilmsen | |
| D612,183 S | 3/2010 | Neuberg et al. | |
| D619,844 S | 7/2010 | Johnson | |
| D623,882 S | 9/2010 | Oster | |
| D626,773 S | 11/2010 | Oster | |
| D632,119 S | 2/2011 | Service | |
| D642,844 S | 8/2011 | Cheris | |
| D657,602 S | 4/2012 | Service | |
| D657,603 S | 4/2012 | Murty | |
| D658,919 S | 5/2012 | Brinker et al. | |
| D660,068 S | 5/2012 | Wang | |
| D666,860 S | 9/2012 | Lubart | |
| D671,784 S | 12/2012 | Gallie, II | |
| D674,226 S | 1/2013 | Greenwald | |
| D676,698 S | 2/2013 | Yang | |

(Continued)

OTHER PUBLICATIONS

Youbyou | Built by [B-MP], "Yoga mat infused with Biocrystal®; a powder of 16 different crystals selected for their strong relaxing effect on Body & Mind.", https://youbyou.yoga/biocrystal-yoga-mat-youbyou/, © 2021.

*Primary Examiner* — George Sun
(74) *Attorney, Agent, or Firm* — Knobbe, Martens, Olson & Bears, LLP

(57) ABSTRACT

In various aspects, a health accessory such as a yoga mat that integrates chakra materials, such as healing crystals, to provide a seamless and holistic healing experience. In one aspect, a yoga mat with integrated granular crystal material, the yoga mat comprising a top layer comprising a base material and a granular crystal material suspended in the base material and a bottom layer comprising a second material different from the base material, the bottom layer attached to the top layer.

19 Claims, 4 Drawing Sheets

(56) References Cited

U.S. PATENT DOCUMENTS

| | | |
|---|---|---|
| D695,043 S | 12/2013 | Middleton |
| D701,061 S | 3/2014 | Allen |
| D707,981 S | 7/2014 | Allen |
| D715,578 S | 10/2014 | Swandal et al. |
| D734,063 S | 7/2015 | Evert et al. |
| D755,538 S | 5/2016 | Robbins, III |
| D758,761 S | 6/2016 | Chang |
| D760,511 S | 7/2016 | Zabielinsky |
| D763,600 S | 8/2016 | Huss et al. |
| D766,620 S | 9/2016 | Gretz |
| D774,326 S | 12/2016 | Chang |
| D796,227 S | 9/2017 | MacNeil et al. |
| D797,472 S | 9/2017 | Scorgie |
| D798,632 S | 10/2017 | Wilczek |
| D802,065 S | 11/2017 | Bertoncello et al. |
| D807,077 S | 1/2018 | Springer |
| D811,773 S | 3/2018 | Yang |
| D817,661 S | 5/2018 | Valentin |
| D837,564 S | 1/2019 | Sheydin |
| D841,360 S | 2/2019 | Swind |
| D856,027 S | 8/2019 | Chang |
| D857,421 S | 8/2019 | Yau |
| D876,123 S | 2/2020 | Scorgie |
| D879,503 S | 3/2020 | Fu |
| D879,505 S | 3/2020 | Lopez |
| D880,628 S | 4/2020 | McHenry |
| D882,293 S | 4/2020 | Huss et al. |
| D888,852 S | 6/2020 | Fu |
| D893,217 S | 8/2020 | Meyer et al. |
| D901,209 S | 11/2020 | Hall et al. |
| D915,786 S | 4/2021 | Brown et al. |
| D918,620 S | 5/2021 | Flemming |
| D925,248 S | 7/2021 | Venugopal |
| D945,793 S | 3/2022 | Cai |
| D946,306 S | 3/2022 | Thelin et al. |
| D946,307 S | 3/2022 | Thelin et al. |
| D957,165 S | 7/2022 | Bradley |
| D959,175 S | 8/2022 | Everard |
| D960,606 S | 8/2022 | Chen |
| D962,678 S | 9/2022 | Cai |
| D982,352 S | 4/2023 | Everard |
| D992,306 S | 7/2023 | Butler et al. |
| D992,929 S | 7/2023 | Morin |
| D995,155 S | 8/2023 | Everard |
| 2013/0040026 A1* | 2/2013 | Bukshpan ............ A23L 3/3535 426/326 |
| 2014/0237718 A1* | 8/2014 | Burch ............... A63B 21/4037 5/417 |
| 2014/0259398 A1* | 9/2014 | Kendall ............. A47G 27/0237 5/420 |
| 2016/0287928 A1* | 10/2016 | Darnell ............. A63B 21/4037 |
| 2017/0095690 A1* | 4/2017 | Sharkey ............ A47G 27/0237 |
| 2018/0092800 A1* | 4/2018 | Chapman ............... A61N 2/002 |
| 2021/0324286 A1* | 10/2021 | Sekine ................ C10M 107/04 |

* cited by examiner

CRYSTAL YOGA MAT

BACKGROUND

"Chakra" is a Sanskrit word meaning "wheel," and in the context of health and wellness, is believed by some to refer to spinning disks of energy or channels located at various points on the body. Certain items or materials, known as "chakra materials," may have positive effects on one's body when used in proximity to chakra points. For example, some believe that certain crystals or metals, when held near a specific area of the body, may release energy blockage, enhance energy flow, promote focus or clarity of the mind, among other benefits.

SUMMARY

Aspects of the present disclosure relate to a yoga mat that integrates granular crystal material to provide a seamless and holistic healing experience. Because crystals and metals are hard objects, incorporating crystals and metals into a yoga mat can make it uncomfortable to stand or lay on the yoga mat. The yoga mats described herein integrate the granular crystal material such that the top surface of the yoga mat remains substantially flat. In some embodiments, the granular crystal material is permanently embedded in a layer of the yoga mat. The granular crystal material may be visible from the top surface of the yoga mat, for example by suspending the granular crystal material in a translucent or transparent material. The granular crystal material may be dispersed throughout a top layer of the yoga mat in a random pattern. The granular crystal material described herein may be a single material or a combination of different materials mixed together or separately added to the yoga mat in distinct sections.

Aspects of the present disclosure relate to a yoga mat comprising a top layer of a base material and a granular crystal material suspended in the base material. In some examples, the yoga mat includes a bottom layer comprising a second material different from the base material, the bottom layer attached to the top layer.

The base material can include a translucent or transparent material such as silicone. The top layer of the yoga mat may include at least a 2:1 ratio of the base material to the granular crystal material by weight. Additional ratios can include 2:1, 2.5:1, or 3:1. The granular crystal material can be dispersed throughout the top layer, for example randomly dispersed throughout the entire top layer. In other configurations, the granular crystal material may only be incorporated into particular sections of the yoga mat or incorporated as a design in the top layer.

A top surface of the top layer may be flat. In some examples of the yoga mat, the granular crystal material may provide a top surface of the top layer with texture. The granular crystal powder may protrude from the top surface by no more than 2 mm, or no more than 1 mm, or not at all.

The second material in the bottom layer may include rubber. In some examples of the yoga mat, the bottom layer is adhered to the top layer by an adhesive.

In some examples of the yoga mat, the top layer may include added coloring. The added coloring may be constant throughout the top layer or added as a gradient from one end of the yoga mat to the other end of the yoga mat. The top layer may include different colors, for example arranged along different sections of the yoga mat in a striped pattern.

In one example, the yoga mat can include a gradient of different colors to form a rainbow pattern. The yoga mat can include the seven chakra colors, such as red, orange, yellow, green, blue, indigo, purple arranged in order as stripes along the yoga mat. Each stripe or band may also include a different type of granular crystal material dispersed, randomly or evenly, throughout the stripe.

Additional examples of the present disclosure relate to a yoga mat, comprising a top layer of silicone and a granular material suspended in the silicone. In addition, the yoga mat may include a bottom layer of rubber, the bottom layer adhered to the top layer by an adhesive.

In some examples, the top layer is not attached to the bottom layer. For example, the top layer with the silicone and granular crystal material may be separate from a bottom layer. The singular layer may be adhered to other materials, objects, items, and the like, and need not be attached to a bottom layer.

The granular material may comprise crystal powder or a similar type of granular material. As noted herein, in some examples, the top surface of the silicone yoga mat may be flat. In other examples, the granular material, such as the crystal powder, can provide the top surface of the yoga mat with texture.

Additional embodiments of the present disclosure relate to a method of manufacturing a yoga mat. In some examples, the method of manufacturing may comprise a series of steps. For example, the method may include mixing a base material and a granular crystal material to suspend the granular crystal material in the base material. In addition, the mixture of the base material and the granular crystal material may be used to fill a mold to form a top layer of the yoga mat. The method can further include setting the top layer until the top layer is solidified. Finally, in some examples, the top layer can be attached to a bottom layer, the bottom layer comprising a second material different from the base material.

In addition to the steps outlined above of the method of manufacturing the yoga mat, the base material may comprise silicone.

Mixing the base material and the granular crystal material may comprise mixing a 2:1 ratio of the base material to the granular crystal material. In addition, the granular crystal material can be dispersed throughout the top layer.

In some embodiments of the method of manufacturing the yoga mat the second material comprising rubber.

It is noted that attaching the top layer to the bottom layer can comprise adhering the top layer to the bottom layer, such as via an adhesive, and the like.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

DETAILED DESCRIPTION

As noted herein, chakra materials may have certain health benefits and may include any material such as crystals, healing crystals, gemstones, metals, colors, herbs, oils, personal mementos, and the like. In addition, some users may desire to hold chakra materials proximate to certain areas of the body. For example, during meditation, a user may desire to position certain chakra materials atop a yoga mat to promote positive vibrations or healing. However, the placement and use of solid crystals and/or large gemstones with health accessories, such as yoga mats, may be cumbersome to users. For example, a user may be prevented from holding or having physical contact with a crystal or gemstone while engaging in certain yoga poses that require the user to hold a body part, such as the user's legs. In addition, placement of crystals or other gemstones atop a yoga mat may be uncomfortable for certain poses and prone to movement or slippage.

Aspects of the present disclosure relate to a yoga mat that integrates granular crystal material, such as healing crystals ("crystals"), to provide a seamless and holistic healing experience. In some embodiments, aspects of the present disclosure relate to a yoga mat comprising a top layer of a base material in which a granular crystal material is suspended.

Figure 1:
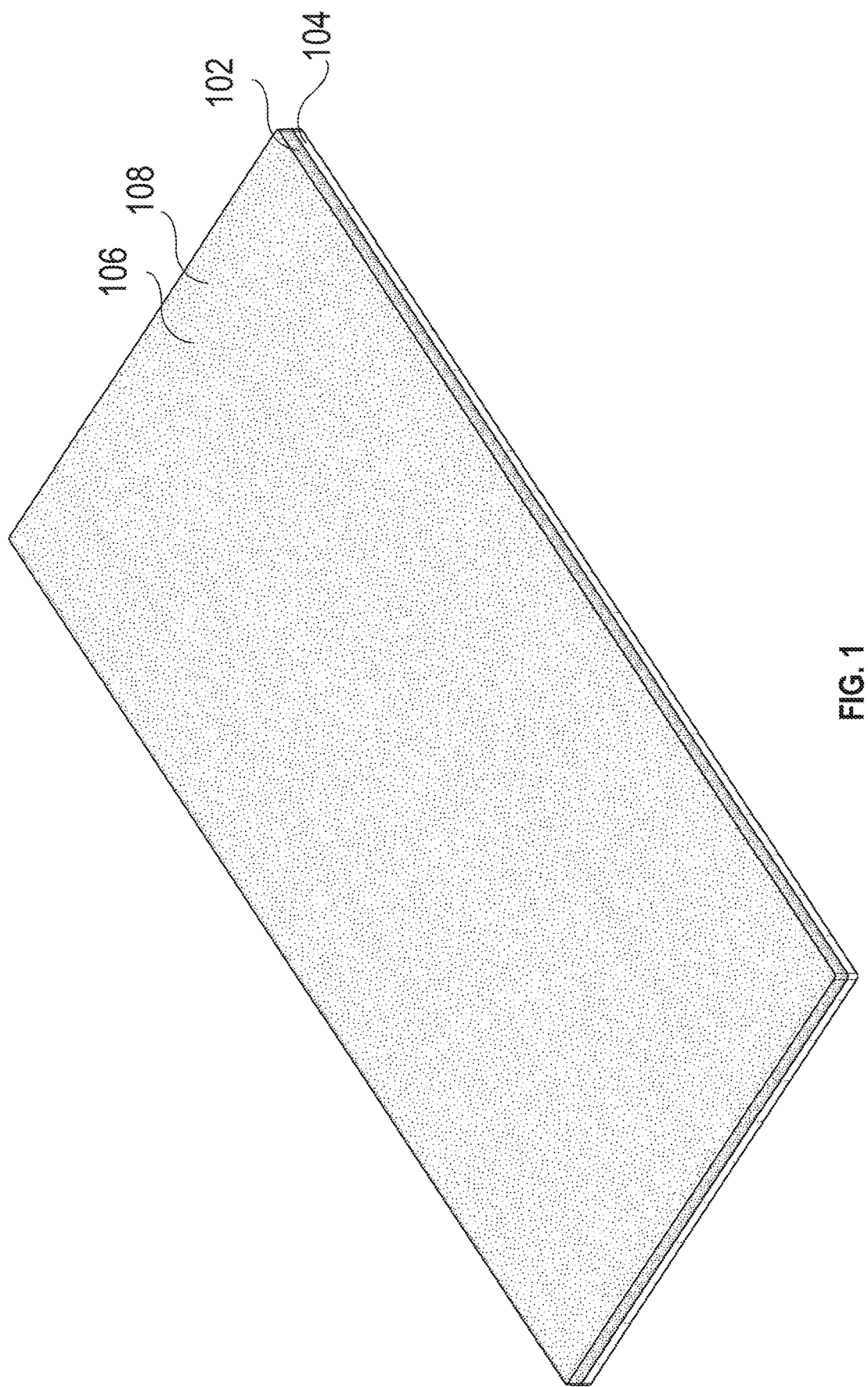
FIG. 1 illustrates an example yoga mat, according to aspects of the present disclosure.

FIG. 1 illustrates a yoga mat 100 with integrated granular crystal material. In some examples, the yoga mat 100 may be any mat used to prevent hands, feet, and other body parts of a user from slipping during yoga, asana, or any other wellness routine. In addition, the yoga mat 100 may be any mat used to provide cushioning or traction.

The yoga mat 100 may be any relevant size or shape. For example, the yoga mat 100 may conform to a dimension standard in the wellness industry (e.g., 24"×68") or any other width and length. In addition, the yoga mat 100 may be any shape, such as a rectangle, square, circle, oval, triangle, diamond, etc.

The yoga mat 100 may comprise chakra materials, such as crystals or gemstones. For example, the yoga mat 100 may comprise one or more crystals in a granular or powder form ("granular crystal material"). In some examples, the granular crystal material 108 may include any solid crystalline material such as but not limited to amethyst, lapis lazuli, agate, jasper, obsidian, citrine, turquoise, tiger's eye, moonstone, bloodstone, sapphire, ruby, onyx, quartz, rose quartz, smoky quartz, garnet, diamond, opal, topaz, aquamarine, emerald, peridot, tourmaline, calcite, selenite, rhodonite, malachite, larimar, morganite, kunzite, petalite, amber, and the like. The granular crystal material 108 may be any crystalline material that has been crushed, pulverized, ground, granulated etc. into a powder, dust, or similar granular form.

The yoga mat 100 may, in some examples, comprise additional materials related to healing or wellness. For example, certain colors may have spiritual significance and meaning in one's wellbeing. To integrate certain colors into the yoga mat, such as the seven chakra colors (red, orange, yellow, green, blue, indigo, and purple) may be included in the yoga mat in various ways. For example, colors may be integrated into the yoga mat by the addition of colored materials, such as added coloring, dyes, sand, powders, and the like.

The yoga mat 100 may comprise one or more layers. In some examples, the yoga mat 100 comprises a layer in which the granular crystal material 108 is suspended. For example, the yoga mat 100 comprises a top layer 102 in which the granular crystal material 108 is suspended. The top layer 102 of the yoga mat 100 may comprise a base material 106, such as silicone. The top layer 102 of the yoga mat 100 may comprise alternative base materials 106 configured to hold the granular material, such as rubber, vinyl, plastic, polyvinyl chloride (PVC), cork, jute, and the like.

In some examples, the base material 106 of the top layer 102 is configured to suspend the granular crystal material 108 throughout the base material 106. For example, in some embodiments, the granular crystal material 108 is dispersed throughout the base material 106. The granular crystal material 108 may be dispersed evenly and/or randomly throughout the base material 106. In addition, the base material 106 may hold one or more granular crystal materials and/or additional materials, such as added coloring, dyes, sand and the like.

As noted herein, the top layer of the yoga mat 100 may comprise the base material 106 and the granular crystal material 108. The top layer of the yoga mat 100 may comprise various ratios of the base material 106 to the granular crystal material 108. Example ratios include 2:1, 2.5:1, 3:1, and the like. The top layer 102 of the yoga mat 100 may comprise different ratios of the base material 106 to the granular crystal material in different areas of the yoga mat 100. In addition, the ratio of the base material 106 to the granular crystal material may be 2:1 by weight. In other examples, the ratio of the base material 106 to the granular crystal material 108 may be another ratio by weight, or in some examples, by volume.

The density of the granular crystal material 108 may also vary in density throughout the top layer 102. For example, certain areas of the yoga mat 100 corresponding to different chakra points may contain different densities of granular crystal material 108 in order to target those chakra points.

As noted herein, the yoga mat 100 may comprise one or more layers. For example, the yoga mat 100 may comprise a bottom layer 104. In some embodiments, the bottom layer 104 of the yoga mat 100 may be configured to prevent slippage of the yoga mat 100 when in use. For example, the bottom layer 104 of the yoga mat 100 may comprise a second material different from the base material 106. For example, the bottom layer 104 may comprise rubber, vinyl, plastic, polyvinyl chloride (PVC), cork, jute, and the like.

In some examples, the top layer 102 and the bottom layer 104 may be reversed such that the bottom layer 104 is positioned on top of the top layer 102. For example, the bottom layer 104 may be attached to the top layer 102 such that the bottom layer 104 is atop the top layer 102.

Figure 2:
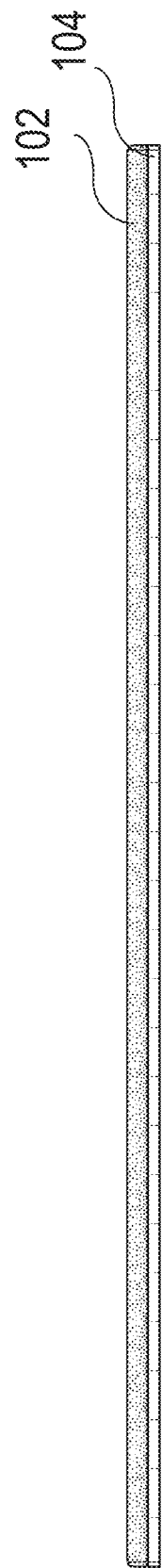
FIG. 2 illustrates a side view of an example yoga mat, according to aspects of the present disclosure.

FIG. 2 illustrates a side view of the yoga mat 100, according to aspects of the present disclosure. As shown in FIG. 2, the yoga mat 100 includes a top layer 102 and a bottom layer 104.

As disclosed herein, the top layer 102 comprises a base material 106 in which the granular crystal material is suspended. The top layer 102 may comprise a base material 106 configured to suspend the granular crystal material 108. For example, the top layer 102 of the yoga mat 100 may comprise a base material 106 of silicone. The top layer 102 of the yoga mat 100 may comprise alternative base materials configured to hold the granular material, such as rubber, vinyl, plastic, polyvinyl chloride (PVC), cork, jute, and the like.

The top layer 102 of the yoga mat 100 may comprise a granular crystal material 108 suspended in the base material 106. For example, as noted herein the granular crystal material 108 may include any crystal, gemstone, etc. in a granular or powder form. In some embodiments, the granular crystal material may include any solid crystalline material such as but not limited to amethyst, lapis lazuli, agate, jasper, obsidian, citrine, turquoise, tiger's eye, moonstone, bloodstone, sapphire, ruby, onyx, quartz, rose quartz, smoky quartz, garnet, diamond, opal, topaz, aquamarine, emerald, peridot, tourmaline, calcite, selenite, rhodonite, malachite, larimar, morganite, kunzite, petalite, amber, and the like. In addition, the granular crystal material 108 may be any crystalline material that has been crushed, pulverized, ground, granulated etc. into a powder, dust, or similar granular form.

In some examples, the granular crystal material 108 is dispersed, such as randomly or evenly, throughout the top layer 102. In addition, the top layer 102 of the yoga mat 100 comprises various ratios of the base material 106 to the granular crystal material. Example ratios include 2:1, 2.5:1, 3:1, and the like. Alternatively, the top layer 102 of the yoga mat 100 comprises different ratios of the base material 106 to the granular crystal material 108 in different areas of the yoga mat 100. For example, certain areas of the top layer 102 of the yoga mat 100 corresponding to different chakra points may contain different densities of granular crystal material 108 in order to target those chakra points.

The granular crystal material 108 may be dispersed evenly and/or randomly throughout a top surface of the top layer 102 to provide the top surface of the top layer 102 with texture. In this example, a user of the yoga mat 100 may feel the granular crystal material. In other examples, the granular crystal material 108 may also be dispersed throughout the top layer 102 such that the top surface of the top layer 102 of the yoga mat 100 is flat.

In some examples, the top layer 102 of the yoga mat 100 may comprise more than one type of granular crystal material 108 and/or added coloring. For example, colorings may be added to certain areas of the mixture in the mold to create various designs, patterns, motifs, words, symbols, etc.

In some examples, a top layer 102 of the yoga mat 100 may contain the seven chakra colors (e.g., purple, indigo, blue, green, yellow, orange, red) from added colorings and corresponding granular crystal materials. In some examples, additional colors may be included. In other examples, less than seven of the chakra colors may be used. For example, the top layer 102 may comprise multiple sections (e.g., 7), each section corresponding to a different chakra color. In some examples, each section may comprise a different type of granular crystal material 108. In addition, each section may comprise a different added coloring, such as sand, dyes, or other colored powders, etc. Each section may be arranged in rows, bands, stripes, etc. that span the width of the yoga mat 100. In some examples, a yoga mat 100 may contain seven different sections, each with a different granular crystal material 108 and different color, to represent the seven chakra colors, including purple, indigo, blue, green, yellow, orange, red. The seven sections may be in a particular order as noted above. In some embodiments, the seven sections may in any order. The yoga mat 100 may also contain a subset of the sections, more or less sections, etc. The sections may also be in alternative configurations, arrangements, design, or orders. In addition, the top layer 102 may comprise more or less sections. In some examples, the top layer 102 comprises a single type of granular crystal material 108. In some examples, the top layer 102 comprises more than one type of granular crystal material 108. In this example, the different types of granular crystal materials may be dispersed throughout the top layer 102 or segmented to a particular area, such as a section, band, or stripe of the top layer 102.

The top layer 102 may have any thickness to allow flexibility and portability of the yoga mat 100. For example, the top layer 102 may have a thickness of at least 1.5 mm and/or less than or equal to 10 mm, for example between 1.5 mm and 3 mm or between 3 mm and 5 mm. The top layer 102 may have a thickness smaller than 3 mm or greater than 5 mm.

As shown in FIG. 2, the yoga mat 100 also comprises a bottom layer 104. In some examples, the bottom layer 104 may comprise a material different from the base material 106 of the top layer 102. For example, the material of the bottom layer 104 may include rubber, vinyl, plastic, polyvinyl chloride (PVC), cork, jute, or any other material configured to prevent slippage of the yoga mat 100.

The bottom layer 104 may have any thickness to allow flexibility and portability of the yoga mat 100. For example, the bottom layer 104 may have a thickness of at least about 1 mm and/or less than or equal to about 5 mm, for example between 1 mm and 3 mm, such as 1.5 mm. In some examples, the bottom layer 104 may have a thickness smaller than 1 mm or greater than 3 mm. The bottom layer 104 may have the same dimensions as the top layer 102.

In some embodiments, the bottom layer 104 is cut from a sheet of the material different from the base material 106 in the shape of the top layer 102. In some embodiments, the yoga mat 100 comprises the top layer 102 without the bottom layer 104.

The bottom layer 104 may be attached to the top layer 102. In some embodiments, the bottom layer 104 is attached to the top layer by an adhesive, such as glue, epoxy, silicone, polymers, binders, and the like. In order to adhere the top layer 102 to the bottom layer 104, the top layer 102 may be scored or buffed to promote adhesion of the adhesive between the layers. In addition, in some cases, the yoga mat 100 comprises the top layer 102 without the bottom layer 104 attached.

Figure 3:
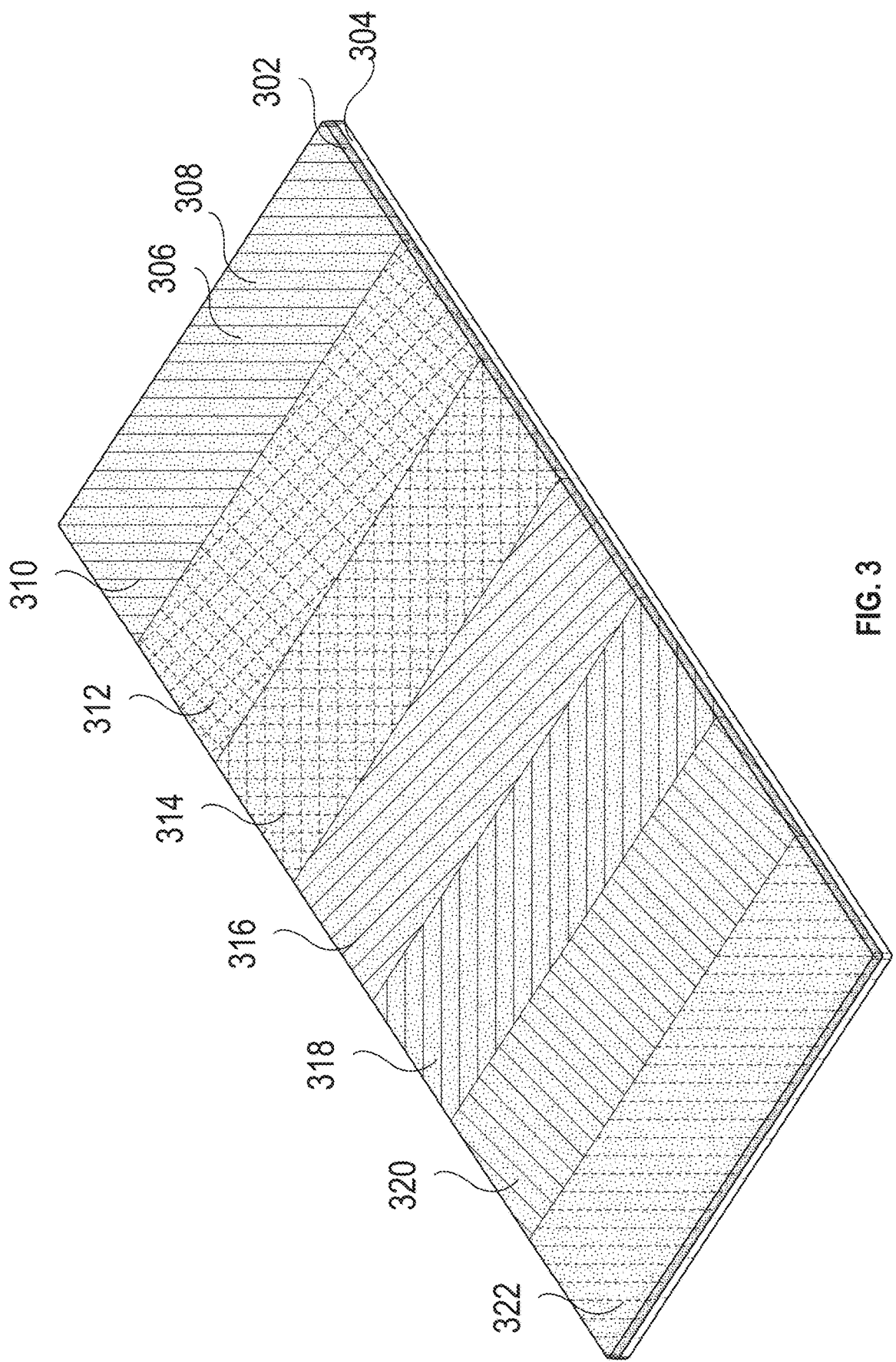
FIG. 3 illustrates an example chakra yoga mat, according to aspects of the present disclosure.

FIG. 3 illustrates an example chakra yoga mat 300, according to aspects of the present disclosure. In one example, the chakra yoga mat 300 can include a gradient of different colors to form a rainbow pattern. The chakra yoga mat 300 can include the seven chakra colors, such as red, orange, yellow, green, blue, indigo, purple arranged in order as stripes along the yoga mat. Each stripe or band of the chakra yoga mat 300 may also include a different type of granular crystal material dispersed, randomly or evenly, throughout the stripe. As shown in FIG. 3, each stripe 310-322 may correspond to a different chakra color, such as red stripe 310, orange stripe 312, yellow stripe 314, green stripe 316, blue stripe 318, indigo stripe 320, and violent stripe 322. Each stripe 310-322 may contain a different type of granular material and/or added coloring. The stripes 310-322 may be in a particular order as noted above. In some embodiments, the seven sections may in any order. The yoga mat 100 may also contain a subset of the sections, more or less sections, etc. The sections may also be in alternative configurations, arrangements, design, or orders.

In some examples, the chakra yoga mat 300 may be any mat used to prevent hands, feet, and other body parts of a user from slipping during yoga, asana, or any other wellness routine. In addition, the chakra yoga mat 300 may be any mat used to provide cushioning or traction.

The chakra yoga mat 300 may be any relevant size or shape. For example, the chakra yoga mat 300 may conform to a dimension standard in the wellness industry (e.g., 24"×68") or any other width and length. In addition, the chakra yoga mat 300 may be any shape, such as a rectangle, square, circle, oval, triangle, diamond, etc.

Each stripe 310-322 of the chakra yoga mat may contain different materials. The chakra yoga mat 300 may comprise chakra materials, such as crystals or gemstones. For example, the chakra yoga mat 300 may comprise one or more granular crystal materials. In some embodiments, the granular crystal material may include any solid crystalline material such as but not limited to amethyst, lapis lazuli, agate, jasper, obsidian, citrine, turquoise, tiger's eye, moonstone, bloodstone, sapphire, ruby, onyx, quartz, rose quartz, smoky quartz, garnet, diamond, opal, topaz, aquamarine, emerald, peridot, tourmaline, calcite, selenite, rhodonite, malachite, larimar, morganite, kunzite, petalite, amber, and the like. The granular crystal material 308 may be any crystalline material that has been crushed, pulverized, ground, granulated etc. into a powder, dust, or similar granular form. Each stripe of the chakra yoga mat may contain a different type of granular crystal material and/or a different added coloring.

As noted herein, chakra yoga mat 300 may, in some examples, comprise additional materials related to healing or wellness. For example, certain colors may have spiritual significance and meaning in one's wellbeing. To integrate certain colors into the yoga mat, such as the seven chakra colors (e.g., red, orange, yellow, green, blue, indigo, and purple) may be included in the yoga mat in various ways. For example, colors may be integrated into the yoga mat by the addition of colored materials, such as added coloring, dyes, sand, powders, and the like.

The chakra yoga mat 300 may comprise one or more layers. In some examples, the chakra yoga mat 300 comprises a layer in which the granular crystal material 308 is suspended. For example, the chakra yoga mat 300 comprises a top layer 302 in which the granular crystal material 308 is suspended. The top layer 302 of the chakra yoga mat 300 may comprise a base material 306, such as silicone. The top layer 302 of the chakra yoga mat 300 may comprise alternative base materials 306 configured to hold the granular material, such as rubber, vinyl, plastic, polyvinyl chloride (PVC), cork, jute, and the like.

In some examples, the base material 306 of the top layer 302 is configured to suspend the granular crystal material 308 throughout the base material 306. For example, in some embodiments, the granular crystal material 308 is dispersed throughout the base material 306. The granular crystal material may be dispersed evenly and/or randomly throughout the base material 306. In addition, the base material 306 may hold one or more granular crystal materials and/or additional materials, such as added coloring, dyes, sand and the like.

As noted herein, the top layer 302 of the chakra yoga mat 300 may comprise the base material 306 and the granular crystal material 308. The top layer 302 of the chakra yoga mat 300 can comprise various ratios of the base material 306 to the granular crystal material 108. Example ratios include 2:1, 2.5:1, 3:1, and the like. The top layer 302 of the chakra yoga mat 300 may comprise different ratios of the base material 306 to the granular crystal material in different areas of the chakra yoga mat 300. The ratio of the base material 306 to the granular crystal material 308 may be 2:1 by weight. In other examples, the ratio of the base material 306 to the granular crystal material 308 may be another ratio by weight, or in some examples, by volume.

The density of the granular crystal material 308 may also vary in density throughout the top layer 302. For example, certain areas of the chakra yoga mat 300 corresponding to different chakra points may contain different densities of granular crystal material 308 in order to target those chakra points.

In some examples, the top layer 302 of the chakra yoga mat 300 may comprise more than one type of granular crystal material 308 and/or added coloring. For example, colorings may be added to certain areas of the mixture in the mold to create various designs, patterns, motifs, words, symbols, etc.

In some examples, a top layer 302 of the chakra yoga mat 300 may contain the seven chakra colors (e.g., purple, indigo, blue, green, yellow, orange, red) from added colorings and corresponding granular crystal materials. In some examples, additional colors may be included. In some examples, less than seven of the chakra colors may be used. For example, the top layer 302 may comprise multiple sections (e.g., 7), each section corresponding to a different chakra color. In some examples, each section may comprise a different type of granular crystal material. In addition, each section may comprise a different added coloring, such as sand, dyes, or other colored powders, etc.

Each section may be arranged in rows, bands, stripes, etc. that span the width of the chakra yoga mat 300. In some examples, a chakra yoga mat 300 may contain seven different sections, each with a different granular crystal material 308 and different color, to represent the seven chakra colors, including purple, indigo, blue, green, yellow, orange, red. The seven sections may in a particular order as noted above. In some embodiments, the seven sections may in any order. In addition, the top layer 302 may comprise more or less sections. In some examples, the top layer 302 comprises a single type of granular crystal material. In some examples, the top layer 302 comprises more than one type of granular crystal material. In addition, the different types of granular crystal materials may be dispersed throughout the top layer 302 or segmented to a particular area, such as a section, of the top layer 302.

As noted herein, the chakra yoga mat 300 may comprise one or more layers. For example, the chakra yoga mat 300 may comprise a bottom layer 304. In some embodiments, the bottom layer 304 of the yoga mat 100 may be configured to prevent slippage of the chakra yoga mat 300 when in use. For example, the bottom layer 304 of the yoga mat 100 may comprise a second material different from the base material 306. For example, the bottom layer 304 may comprise rubber, vinyl, plastic, polyvinyl chloride (PVC), cork, jute, and the like.

In some examples, the top layer 102 and the bottom layer 104 may be reversed such that the bottom layer 104 is positioned on top of the top layer 102. For example, the bottom layer 104 may be attached to the top layer 102 such that the bottom layer 104 is atop the top layer 102.

Figure 4:
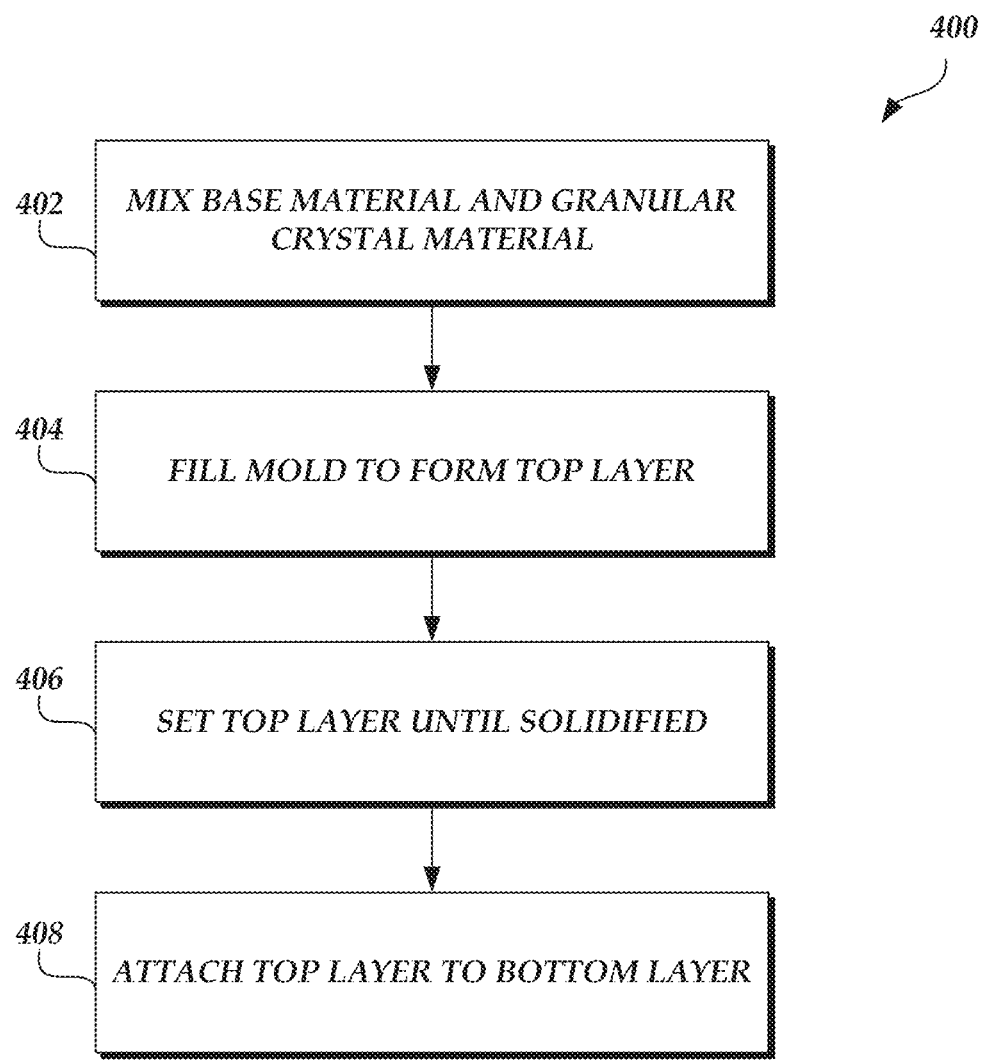
FIG. 4 is a flow diagram depicting an example routine of manufacture of a yoga mat, according to aspects of the present disclosure.

FIG. 4 is a flow diagram depicting an example routine 400 of manufacture of the yoga mat 100, according to aspects of the present disclosure. Routine 400 may be executed by a user, a manufacturer, a machine, or any other entity configured to execute the steps as described below.

At block 402, a base material 106 and granular material 108 are mixed. In some examples, at block 402, the base material 106 and the granular crystal material 108 are mixed to suspend the granular crystal material 108 in the base material 106.

The base material 106 may comprise silicone. In other examples, the base material 106 comprises any material configured to suspend the granular material, such as rubber, vinyl, plastic, polyvinyl chloride (PVC), cork, jute, and the like.

The granular crystal material 108 may include any crystal, gemstone, etc. in a granular or powder form. For example, the granular crystal material 108 may include any solid crystalline material such as but not limited to amethyst, lapis lazuli, agate, jasper, obsidian, citrine, turquoise, tiger's eye, moonstone, bloodstone, sapphire, ruby, onyx, quartz, rose quartz, smoky quartz, garnet, diamond, opal, topaz, aquamarine, emerald, peridot, tourmaline, calcite, selenite, rhodonite, malachite, larimar, morganite, kunzite, petalite, amber, and the like. In addition, the granular crystal material 108 may be any crystalline material that has been crushed, pulverized, ground, granulated etc. into a powder, dust, or similar granular form.

In some examples, at block 402, the base material 106 and the granular crystal material 108 are mixed in a ratio. For example, mixing the base material 106 and the granular crystal material 108 comprises mixing a 2:1 ratio of the base material 106 to the granular crystal material 108. Other ratios may include 2:1, 2.5:1, 3:1, etc. of the base material 106 to the granular crystal material 108. In some examples, the ratio of the base material 106 to the granular crystal material 108 is 2:1 by weight. In some examples, the ratio of the base material 106 to the granular crystal material 108 may be another ratio by weight. Alternatively, the ratio of the base material 106 to the granular material 108 may be by volume.

In some examples, at block 402, mixing the base material 106 and the granular crystal material 108 may include mixing in additional materials. For example, additional materials, such as added coloring, dyes, sand, etc. may be mixed with the base material 106 and the granular crystal material 108.

At block 404, a mold is filled to form a top layer of the yoga mat. In some examples, the mold is filled with the base material 106 and the granular crystal material 108 to form a top layer 102 of the yoga mat. A mold in the shape of the yoga mat 100 may be filled at block 404. For example, the mold may be any shape, size, depth, width, length, etc. of the yoga mat 100. In some examples, the mold is filled with the mixture of the base material 106 and the granular crystal material 108, and any other additional materials such as added coloring, dyes, sand, etc.

Once the mold is filled with the mixture of the base material 106 and the granular crystal material, the mixture may be further "raked" or stirred. For example, additional raking, swirling, or stirring may be executed in order to disperse the granular crystal material 108 and/or additional materials in the base material 106.

In some examples, the mold may be filled such that different areas of the top layer 102 comprise different ratios of the base material 106 to the granular crystal material 108. For example, certain areas of the yoga mat 100 may correspond to different chakra points and may contain different densities or combinations of granular crystal material 108.

In addition, once the mold is filled with the mixture of the base material 106 and the granular crystal material 108, additional materials, such as added coloring, dyes, sand, etc. may be added. In some embodiments, additional materials may be added to certain areas of the mold. For example, colorings may be added to certain areas of the mixture in the mold to create various designs, patterns, motifs, words, symbols, etc.

In some examples, a top layer 102 of the yoga mat 100 may contain the seven chakra colors (e.g., purple, indigo, blue, green, yellow, orange, red) from added colorings and corresponding granular crystal materials. For example, the top layer 102 may comprise multiple sections (e.g., 7), each section corresponding to a different chakra color. In some examples, additional colors may be included. In some examples, less than seven of the chakra colors may be used.

In some examples, each section may be mixed separately before poured into the mold. For example, mold may be filled with the base material 106 before each type of granular crystal material 108 and coloring is added to create multiple sections. For example, the mold may be filled with the base material 106 to which a first type of granular crystal material 108 is added to a particular area of the mold such that the corresponding section of the yoga mat 100 contains the first type of granular crystal material 108 and/or other added coloring. In addition, a second type of granular material is added to another section of the mold such that the corresponding section of the yoga mat 100 contains the second type of granular material and/or other added coloring.

This process can be repeated for seven sections of the yoga mat. In some examples, each section may comprise a different type of granular crystal material. In addition, each section may comprise a different added coloring, such as sand, dyes, or other colored powders, etc.

In some examples, the base material 106 and the granular crystal material 108 may be poured in the mold to form multiple sections. For example, each section may be arranged in rows or bands that span the width of the yoga mat 100. In some examples, a yoga mat 100 may contain seven different sections, each with a different granular crystal material 108 and different color, to represent the seven chakra colors, including purple, indigo, blue, green, yellow, orange, red. The seven sections may in a particular order as noted above. The top layer 102 may comprise more or less sections. In some examples, the top layer 102 comprises a single type of granular crystal material. The top layer 102 may comprise more than one type of granular crystal material. In this example, the different types of granular crystal materials may be dispersed throughout the top layer 102 or segmented to a particular area, such as a section, of the top layer 102.

At block 406, the top layer 102 is set until solidified. Setting the top layer 102 comprises waiting a certain amount of time for the top layer 102 to set from a liquid form to a solid form. In some examples, setting the top layer 102 comprises waiting anywhere from 8-12 hours or more until the top layer 102 is completely solidified. For example, the top layer 102 may be set by air drying, drying under certain conditions such as specific temperatures, etc.

At block 408, the top layer 102 is attached to a bottom layer 104. As noted herein, the bottom layer 104 may comprise a material different from the top layer 102. In some cases, the bottom layer 104 comprises rubber.

Attaching the top layer 102 to the bottom layer 104 may comprise adhering the top layer 102 to the bottom layer 104. In some examples, the bottom layer 104 is attached to the top layer by an adhesive, such as glue, epoxy, silicone, polymers, binders, and the like. In order to adhere the top layer 102 to the bottom layer 104, the top layer 102 may be scored or buffed to promote adhesion of the adhesive between the layers. For example, a bottom surface of the top layer 102 may be scored, scratched, or buffed to promote adhesion of the adhesive between the layers. The top layer 102 and the bottom layer 104 may be compressed together to promote adhesion.

In some examples, the yoga mat 100 comprises the top layer 102 without the bottom layer 104 attached. For example, although the figures show a top layer 102 and a bottom layer 104, the yoga mat 100 may comprise a single layer comprising the top layer 102. The top layer 102 can also be attached to other materials, items, or objects.

Although certain embodiments have been described herein with respect to yoga mat, the features and methods described herein can be incorporated into mats other than yoga mats, for example standing desk mats, kitchen mats, bath mats, door mats, etc.

The terms "approximately," "about," and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount. As another example, in certain embodiments, the terms "substantially flat" refer to a value, amount, or characteristic that departs from exactly flat by less than 2 mm.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

What is claimed is:

1. A yoga mat comprising:
   a top layer comprising a base material and a granular crystal material suspended in the base material, the top layer comprising at least a 2:1 ratio of the base material to the granular crystal material by weight; and
   a bottom layer formed from a second base material different from the base material, the bottom layer attached to the top layer, the bottom layer forming a bottommost surface of the yoga mat.

2. The yoga mat of claim 1, the base material comprising silicone.

3. The yoga mat of claim 1, the granular crystal material dispersed throughout the top layer.

4. The yoga mat of claim 1, the top layer comprising added coloring throughout the base material of the top layer.

5. The yoga mat of claim 1, wherein a top surface of the top layer is flat.

6. The yoga mat of claim 1, the granular crystal material providing a top surface of the top layer with texture.

7. The yoga mat of claim 1, the second base material comprising rubber.

8. The yoga mat of claim 1, wherein the bottom layer is adhered to the top layer by an adhesive.

9. A yoga mat, comprising:
   a top layer comprising colored silicone and a granular material suspended throughout the colored silicone, the top layer comprising at least a 2:1 ratio of the colored silicone to the granular material; and
   a bottom layer comprising rubber, the bottom layer adhered to the top layer by an adhesive, the bottom layer forming a bottommost surface of the yoga mat.

10. The yoga mat of claim 9, the granular material comprising crystal powder.

11. The yoga mat of claim 9, wherein a top surface of the top layer is flat.

12. The yoga mat of claim 9, the granular material providing a top surface of the top layer with texture.

13. The yoga mat of claim 9, wherein the yoga mat consists of the top layer and the bottom layer.

14. A method of manufacturing a yoga mat, comprising:
    mixing a base material and a granular crystal material to suspend the granular crystal material in the base material, wherein mixing the base material and the granular crystal material comprises mixing at least a 2:1 ratio of the base material to the granular crystal material;
    filling a mold with the mixture of the base material and the granular crystal material to form a top layer of the yoga mat with the granular crystal material dispersed throughout the base material of the top layer;
    setting the top layer until the top layer is solidified; and
    attaching the top layer to a bottom layer, the bottom layer comprising a second material different from the base material, the bottom layer forming a bottommost surface of the yoga mat.

15. The method of claim 14, the base material comprising silicone.

16. The method of claim 14, the second material comprising rubber.

17. The method of claim 14, wherein attaching the top layer to the bottom layer comprises adhering the top layer to the bottom layer.

18. A yoga mat, comprising:
    a top layer comprising a silicone and a granular crystal material suspended in the silicone, wherein the granular crystal material is dispersed throughout the top layer by at least a 2:1 ratio of the silicone to the granular crystal material.

19. The yoga mat of claim 18, further comprising a bottom layer comprising rubber, the top layer positioned over the bottom layer without attachment.

* * * * *